Oct. 31, 1933.  E. H. ZANOTTO  1,933,037
SAWMILL
Filed July 7, 1933  3 Sheets-Sheet 2
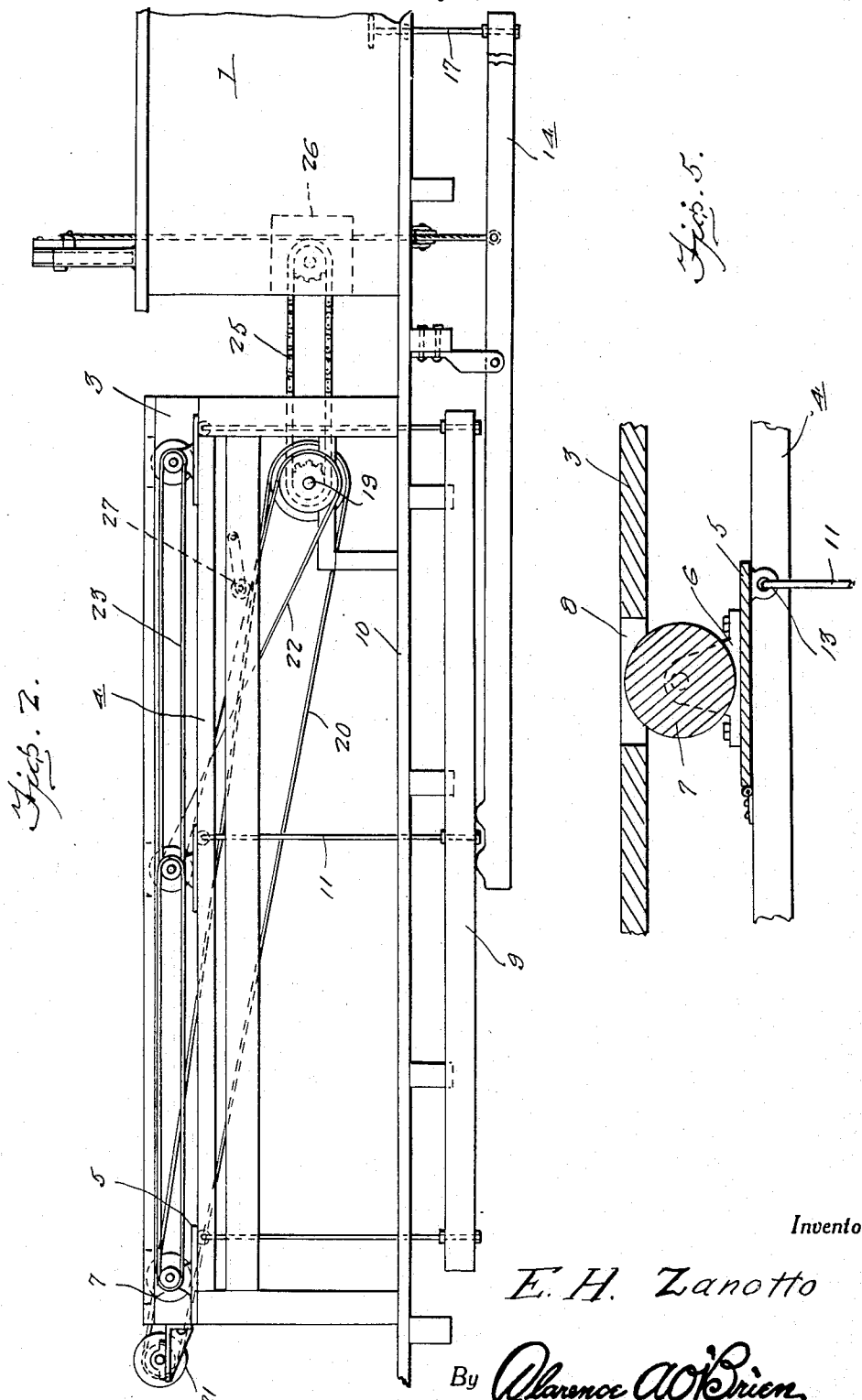
Inventor
E. H. Zanotto
By Clarence A. O'Brien
Attorney Oct. 31, 1933.   E. H. ZANOTTO   1,933,037
SAWMILL
Filed July 7, 1933   3 Sheets-Sheet 3
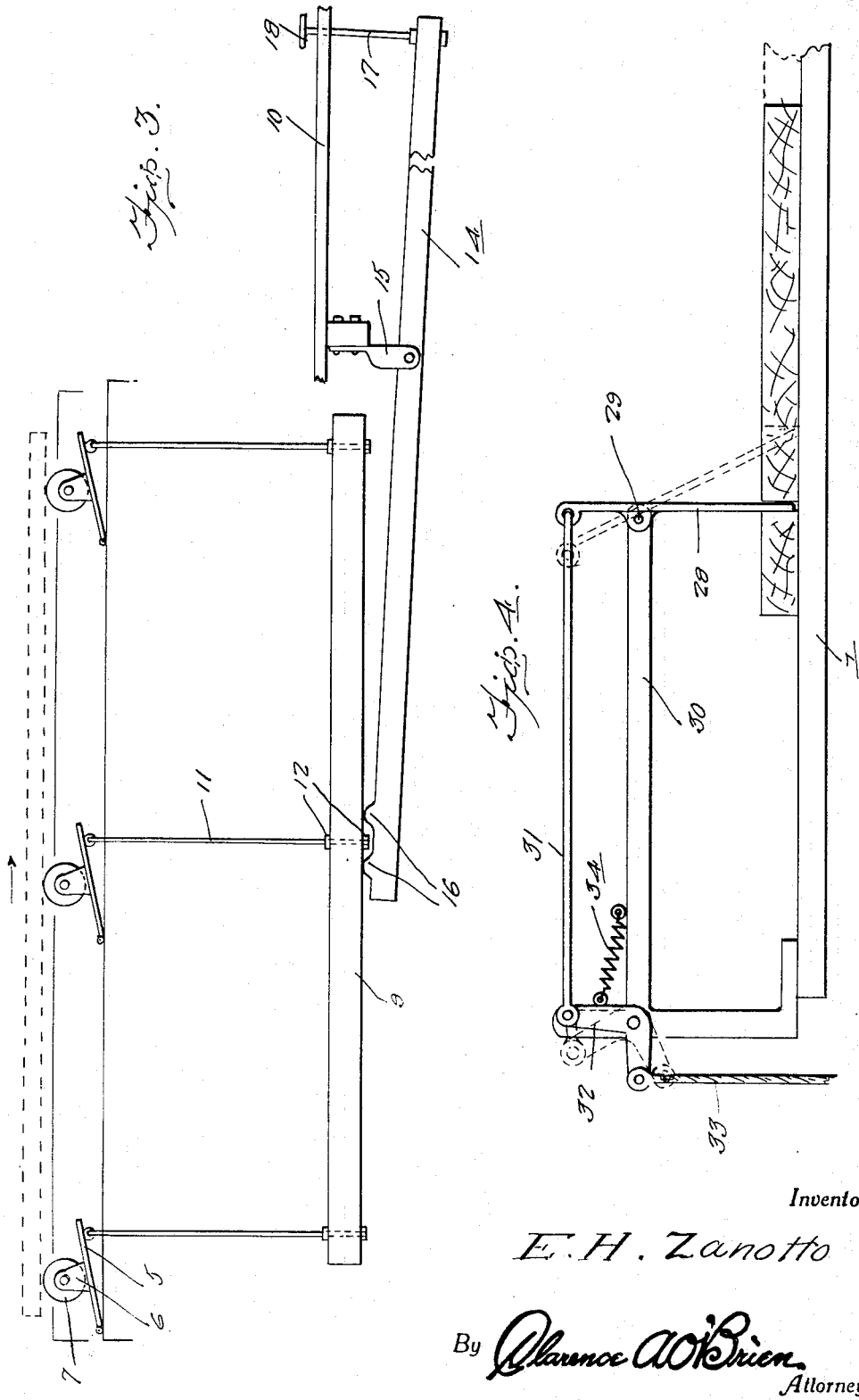
Inventor
E. H. Zanotto
By Clarence A. O'Brien
Attorney

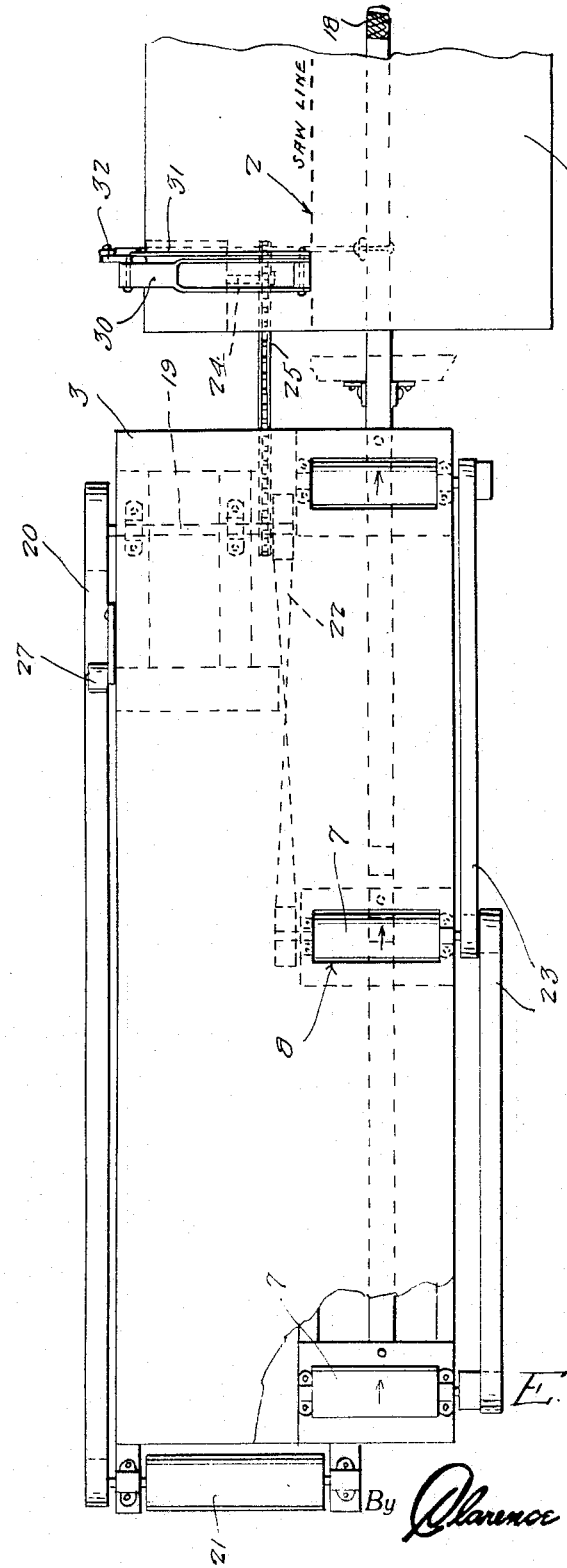

UNITED STATES PATENT OFFICE 1,933,037

SAWMILL

Enrico H. Zanotto, Hilts, Calif.

Application July 7, 1933. Serial No. 679,417

1 Claim. (Cl. 143—33)

This invention relates to improvements in saw mills, the general object of the invention being to provide manually operated means for returning the lumber to the sawing point after a piece of the lumber has been sawed therefrom.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is a plan view, with parts broken away, of the apparatus.

Figure 2 is an elevation thereof.

Figure 3 is a partial elevation, showing the return rollers in raised position.

Figure 4 is a side view of the means for moving the lumber sidewise.

Figure 5 is a sectional detail view of one of the return rollers and its supporting means.

In these drawings, the numeral 1 indicates a part of the saw table, the saw line of which is shown at 2 and the numeral 3 indicates the table for receiving the lumber after it has passed from the table 1.

In carrying out my invention, I provide a horizontal supporting member 4 below the top of the table 3 on which rests a number of hinged plates 5, each of which carries the bearings 6 for the roller 7. The top of the table 3 is formed with the openings 8, one for each roller, and when the plate 5 is tilted, the roller 7 will project above the table top through the opening 8, but in the normal position of the parts, the roller is below the table top, as shown in Figure 5. A bar 9 is located below the platform 10 of the mill and has the lower ends of a number of rods 11 connected therewith by the upper and lower nuts 12. The upper ends of these rods are pivotally connected to the plates 5, as shown at 13, so that when the bar 9 is raised, the plates will be raised so that the rollers will be projected through the openings 8.

A treadle bar 14 is pivotally supported intermediate its ends, as shown at 15, and one end of this bar has the upwardly extending projections 16 thereon for engaging the central portion of the bar 9 and a pedal rod 17 is connected to the opposite end of the bar 14 and passes through a hole in the platform 10, where it is provided with a foot piece 18. Thus by depressing the rod 17 by the foot, the treadle bar 14 is rocked so as to raise the bar 9, which results in raising the plates 5 so that the rollers 7 are projected through the openings 8.

As shown in Figure 1, the rollers are arranged to one side of the longitudinal center of the table top 3 and to one side of the plane of the saw line of the table 1, so that a piece of lumber from which a part has been sawed will pass over these rollers and as the rollers are rotated in the direction of the arrows shown in Figure 1 and the rollers are raised, they will move the lumber back upon the table 1 so that it can be again passed through the saw to have another piece sawed therefrom.

A shaft 19 is rotatably supported in the lower part of the table 3 adjacent the front end thereof and this shaft is connected by the belt and pulleys, as shown generally at 20, to a roller 21 of the table 3 and said shaft is also connected by a belt and pulleys, shown generally at 22, with the center roller 7 and this roller in turn is connected by the belts and pulleys, shown generally at 23, with the other rollers 7.

The shaft 19 is driven from a shaft 24 through means of the chain and sprockets, shown generally at 25, and this shaft is driven from any suitable movable part of the saw mill through gearing placed in a box 26. A belt tightener 27 is provided for the belt 20.

I also provide means for moving the returning piece of lumber to one side of the saw line when the treadle bar 14 is depressed, such means including a lever 28 pivoted intermediate its ends by a pin 29 to a supporting member 30 on the table 1 and having its upper end connected by a link 31 to a bell crank 32 which is connected by the cable 33 to the front part of the treadle bar 14. A spring 34 normally holds the parts in position, with the lower end of the lever 28 in the saw slot of the lumber being sawed and when the treadle bar 14 is depressed, the lever 28 is moved to the dotted line position shown in Figure 4, so that the returning piece of lumber moves outwardly away from the saw line.

Thus I have provided simple means whereby a piece of lumber from which a piece has been sawed can be returned to the sawing position so that another piece can be sawed therefrom, with means for preventing the returning piece of lumber from striking the saw.

It is thought from the foregoing description that the advantages and novel features of the invention will be readily apparent.

It is to be understood that changes may be made in the construction and in the combination and arrangement of the several parts, provided that such changes fall within the scope of the appended claim.

What is claimed is:—

In a saw mill, a table for receiving the lumber leaving the saw thereof, said table having transverse openings at one side of the top thereof, a roller normally located below the top adjacent each opening, plates on which each roller is rotatably supported, a bar, rods connecting the plates with said bar, a treadle bar for moving the first mentioned bar upwardly to project the rollers through the openings, means for turning the rollers in a direction to move a piece of lumber engaged thereby to the sawing point, a lever pivotally supported on the sawing table and extending into the kerf made by the saw in a piece of lumber, and means operated by the depression of the treadle bar for swinging said lever to move the returning piece of lumber to one side of the saw line.

ENRICO H. ZANOTTO.